A. MICHOUD.
SELF INDICATING TARGET.
APPLICATION FILED JAN. 28, 1914. RENEWED MAY 9, 1918.
1,402,523.
Patented Jan. 3, 1922.
5 SHEETS—SHEET 2.
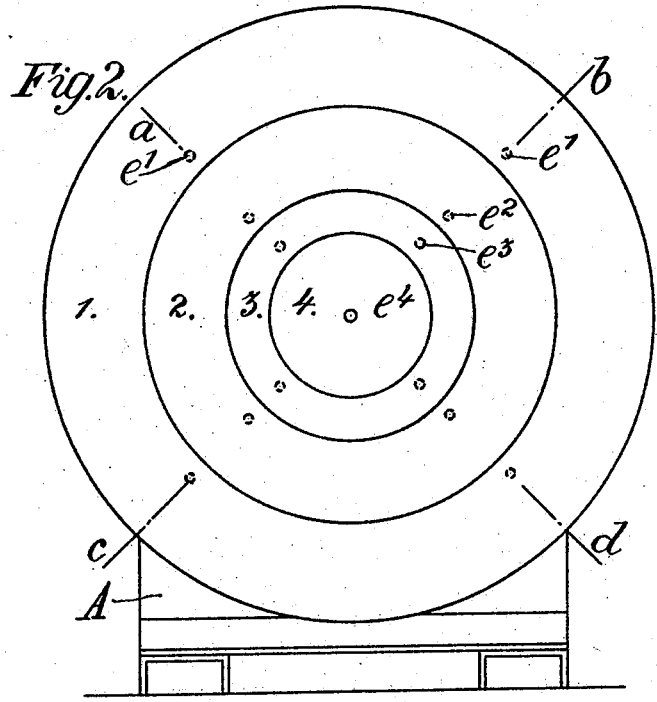
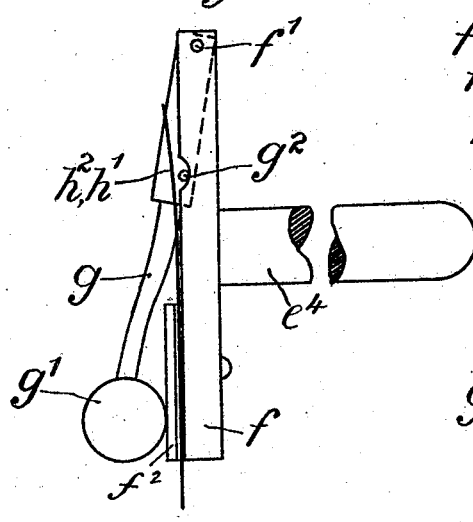
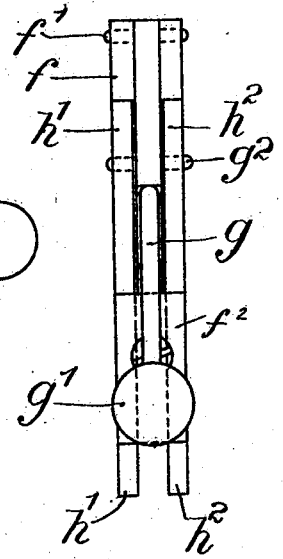

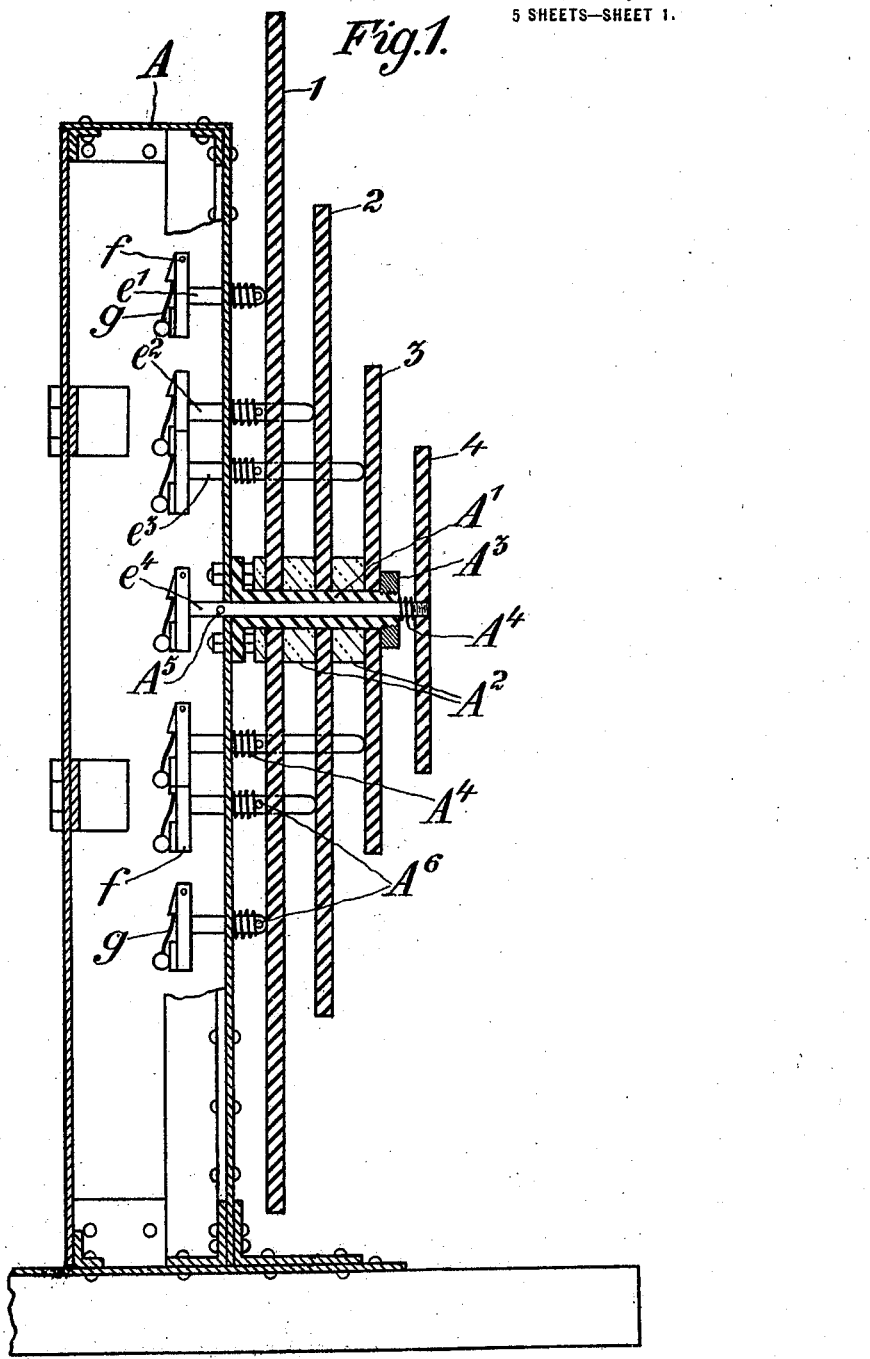

A. MICHOUD.
SELF INDICATING TARGET.
APPLICATION FILED JAN. 28, 1914. RENEWED MAY 9, 1918.
1,402,523.
Patented Jan. 3, 1922.
5 SHEETS—SHEET 3.
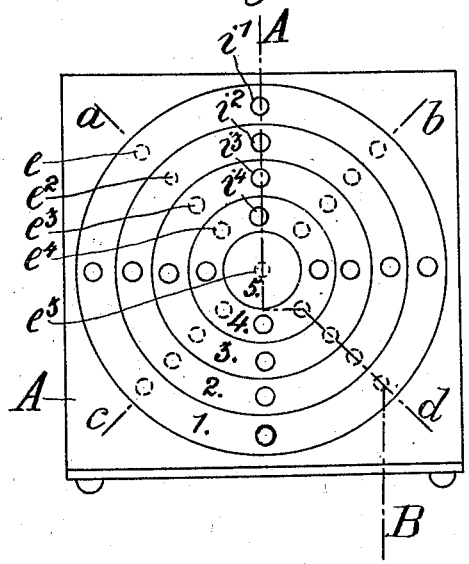
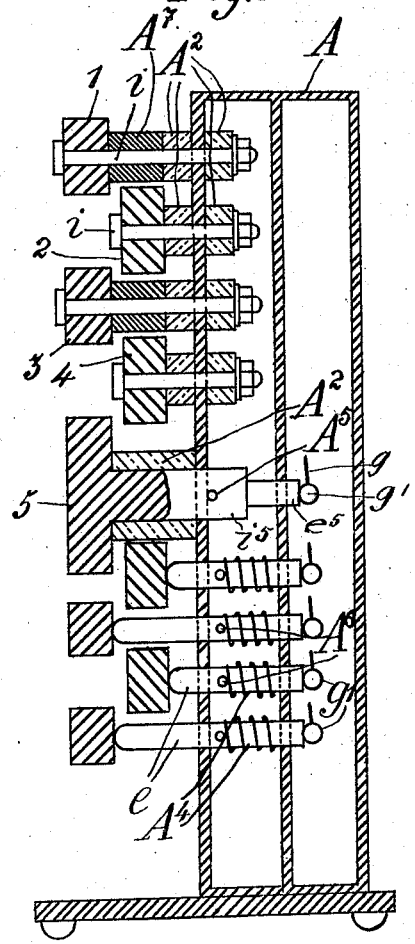
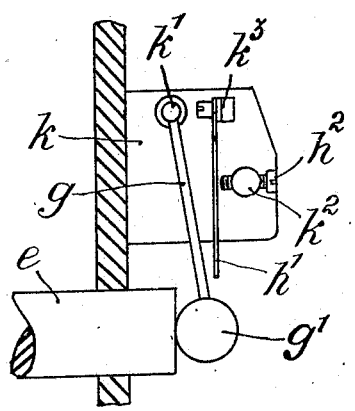

A. MICHOUD.
SELF INDICATING TARGET.
APPLICATION FILED JAN. 28, 1914. RENEWED MAY 9, 1918.

1,402,523.

Patented Jan. 3, 1922.
5 SHEETS—SHEET 4.

UNITED STATES PATENT OFFICE.

ARNOLD MICHOUD, OF YVERDON, SWITZERLAND.

SELF-INDICATING TARGET.

1,402,523.     Specification of Letters Patent.     Patented Jan. 3, 1922.

Application filed January 28, 1914. Serial No. 814,873. Renewed May 9, 1918. Serial No. 233,480½.

(GRANTED UNDER THE PROVISIONS OF THE ACT OF MARCH 3, 1921, 41 STAT. L., 1313.)

*To all whom it may concern:*

Be it known that I, ARNOLD MICHOUD, electrician, a citizen of Switzerland, residing at Yverdon, Canton of Vaud, in the Confederation of Switzerland, have invented certain new and useful Improvements in Self-Indicating Targets, (for which I have filed applications in Switzerland February 1, 1913, and November 8, 1913, and in Germany Oct. 27, 1913,) of which the following is a specification.

My invention relates to improvements in self-indicating targets, composed of a number of elements, concentric discs or rings, or both, which are provided, one for each sector and each disc or ring, with contact apparatus made with a contact pin striking against a pendulum suspended at the targets frame-work and causing contact, to open a current from a source of electricity. The currents thus opened are transmitted to an indicating board at the shooter's stand, where discs will appear behind windows, said discs being attached to levers worked by electromagnets and showing the sector or the element of the target which has been hit by a bullet.

In the following specification reference will be had to targets composed of several elements, but it is evident that the features common to my invention may quite as well be employed to targets formed only of one element, for instance to targets representing upright or kneeling men.

I attain the object of my invention by the arrangement of parts illustrated in the accompanying drawing in which—

Figs. 1 to 4 refer to a form of a target composed of four elements, shaped like discs and Figs. 5 to 7 to a target composed of five elements shaped like rings and a center disc and Figs. 8 to 12 to the electrical connections and accessories.

Fig. 1 represents a vertical section on the center line of a target made of concentric discs, Fig. 2 is a front elevation of a target, and Figs. 3 and 4 are side and front elevations of a contact apparatus.

Fig. 5 is a front elevation of a target made of five concentric rings, Fig. 6 an enlarged section thereof on line A—B, Fig. 5 and Fig. 7 a side elevation and partial section of a contact apparatus.

Similar letters refer to similar parts throughout the several views.

Figure 8:
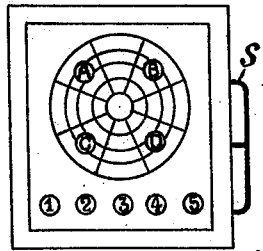
Fig. 8 is a front view of a board indicating at the shooting place the hits made on the target.

According to Figs. 1 to 4 a target composed of three concentric discs 1, 2 and 3, which, being mounted on a flanged sleeve $A^1$, are separated from each other by washers $A^2$ made of wood or rubber, and kept tightly together by a screw nut $A^3$. These members are bolted by the flanged part of the sleeve against the outside of the back wall of a frame work or case A made of strong sheet iron. By this manner of mounting the discs will be free to make a small shaking movement, whenever they are struck by a projectile.

A fourth disc 4 forming the center part of the target and set in front of the three other discs, is supported by the one end of a pin $e^4$, which is loosely fitted within the flanged sleeve $A^1$ and is provided with a cylindrical spring $A^4$ between disk 3 and 4, and a pin $A^5$ is employed for keeping the pin $e^4$ in its position within the sleeve $A^1$. At the other end of pin $e^4$ projecting into the inside of case A a very sensitive contact apparatus is fixed, such as represented in Figs. 3 and 4. This preferably consists of a bar $f$ fixed vertically and cross-wise to said pin and of a pendulum with weight $g^1$ and lever $g$ linked at $f^1$ to the upper slotted part of the cross bar $f$ and resting by means of the weight $g^1$ against a plate $f^2$ secured at the bottom part of the cross bar. Between this plate and the bar and electrically insulated from both two springy strips $h^1$, $h^2$ are secured and extend upwards on both sides of the pendulum, so as to make contact with it, whenever the pendulum moves outwardly, by means of a cross pin $g^2$ fixed at the upper part of the same, said pin resting otherwise when the pendulum is at rest, in two notches provided on cross bar $f$.

Any bullet striking against disc 4 will cause the weight $g^1$ to move outwardly and will therefore momentarily bring the pin $g^2$ into contact with the two strips $h^1$, $h^2$.

In a similar way the other three discs 1, 2, 3 are provided with means for causing electrical contacts when projectiles strike against the target.

There are in all twelve pins $e^1$, $e^2$, $e^3$, four for each of the three discs, lodged with some play in holes of the back wall of case A. These pins bear with their rounded off fore-ends against the backside of the discs by the action of springs $A^4$ which rest against the pins $A^6$, the pins of the outer discs passing through appreciably larger holes provided therefor in the inner discs.

Inside of case A each pin carries at its back end a contact apparatus solidly attached to it, of the same construction as the one described for pin $e^4$ and as represented in Figs. 3 and 4. The pins are distributed on two axes $a$—$d$ and $b$—$c$, set crosswise at 45° to the horizon, always with the four pins for each disc at the same distance from its center, as shown in Fig. 2.

Instead of having a target composed of concentric discs a target might also be formed of concentric rings according to Figs. 5 and 6 for five elements, four rings 1, 2, 3 and 4 and a center disc 5.

The rings are fastened to the outer wall of the double back wall of case A by means of bolts $i$ each having washers of yielding material $A^2$, $A^2$ inserted between the ring and the wall and between the nut and the wall. The rings 1, 2, 3 and 4 are arranged in two rows, a front row and a back row, in such a way, that each alternate ring is set in the back row having its borders overlapped to some extent by the borders of the rings in the front row, which owing to their greater distance from the wall of case A are all provided with additional metal washers $A^7$ on their bolts $i$. The center disc is also fastened to the outer back wall of case A by means of a pin-like projecting part $i^5$ having an elastic washer $A^2$ between the ring and back wall of case A and a pin $A^5$ inside of said wall in order to keep the center disc 5 in its position. From the projecting part $i^5$ of the center disc 5 still another pin-like projection $e^5$ of smaller diameter passes through a hole in the inner back wall of case A and bears with its faced end against a weight $g^1$ of a pendulum $g$ which is part of a contact apparatus fixed against the inside of the inner back wall of case A.

The mechanical contacts for the rings 1, 2, 3 and 4 are made in a like manner, as has been explained for the discs with reference to Figs. 1 and 2, by means of pins $e^1$, $e^2$, $e^3$, $e^4$. There are also four pins for each disc which are distributed on two crosswise axes $a$—$d$ and $b$—$c$ as represented in Fig. 5. These pins however according to Fig. 6 extend through both back walls of case A and bear with faced ends against weights $g^1$ of contact apparatus, which are fixed against the inner side of the inner back wall, and are thereby better protected against dirt and fragments of projectiles.

It will be noticed that in this structure, the contact apparatus is not attached to a movable part as are the contact pins shown in Figs. 1, 3 and 4, but is fixed to the stationary wall of the case A and that therefore this apparatus is very sensitive.

As seen in Fig. 7 it mainly consists of a piece of sheet iron $k$ fixed perpendicularly to the inside of the inner back wall of case A, whereon a pendulum $g$, $g^1$ is suspended at $k^1$, and two studs $k^2$, $k^3$ are secured. One stud $k^2$ carries an adjustable contact screw $h^2$ and the other stud $k^3$ is electrically insulated from the sheet iron K and carries a springy metal strip $h^1$, which is set in such a way and at such a distance between the pendulum and the contact screw, that, whenever owing to the impact of the bullets on the target, the contact pin $e$ causes the pendulum $g$, $g^1$ to move outwardly, the latter will strike against the strip $h^1$ and will simultaneously make an electrical contact by pushing the strip $h^1$ against the contact screw $h^2$.

The aim of the above described distribution and arrangement of pins is to have the target, as a whole, divided in eight sectors, similar to those shown in the view of the target, which is drawn on a small scale on the indicating board in Fig. 8.

Due to the sensitiveness of the contact devices the motion imparted to any disc or ring upon being hit by a bullet or projectile causes all hits at the target in one of the sectors corresponding to those on the indicating board, marked with A, B, C and D in Fig. 8, to make electrical contact by means of those contact devices only, which are placed behind the corresponding sectors of the target; whereas all hits at the four intermediate sectors will so move the discs or rings as to make two simultaneous electrical contacts in the contact devices placed behind both adjacent sectors.

In order to afford easy means for marking on an indicating board at the shooting place, the hits made, four windows are cut out within the sectors placed at 45° in Fig. 8, behind which the letters A, B, C and D will appear whenever hits have been made at the target in one of the corresponding sectors or at the intermediate sectors. In order to show on the indicating board also the distance of the hits from the center of the target, five other windows have been provided corresponding to the five elements, center disc and four rings, whereof the target is composed, behind which windows one of the figures 1, 2, 3, 4 or 5 will appear, according as the corresponding element of the target has been hit.

Figure 9:
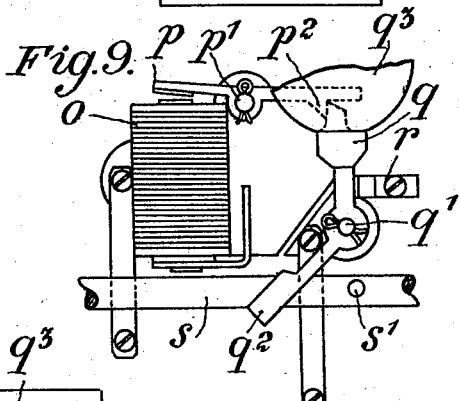
Figs. 9 and 10 are front and side elevations of one of the electromagnets used in the board shown in Fig. 8.
Figure 10:
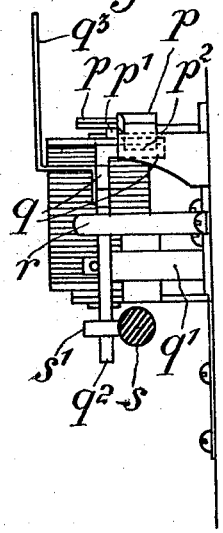

The device for operating the appearance of these letters and figures is shown in Figs. 9 and 10.

The letters and figures which are to appear behind the windows of the indicating board are painted on light metal discs $q^3$, each carried by the upright end of an angular lever $q$ which is pivoted on pin $q^1$ fast to the back side of the board. Lever $q$ is maintained in such a position by a catch $p^2$ which projects from one end of a lever $p$ pivoted at $p^1$, the other end of which carries an armature operated by an electromagnet $o$, and is kept engaged with a projecting edge of the lever $q$ by the pressure of a flat spring $r$ fixed to the back side of the board. When there is no current in the electro-magnet, lever $p$ will be in the position described, but when a current in the electro-magnet causes it to attract the armature moving thereby lever $p$, the catch $p^2$ will be released from its engagement with lever $q$. This lever will swing round by the action of spring $r$ and counter weight $q^2$ until it comes to rest against pin $S^1$ provided on a sliding rod S and thereby will bring the metal disc $q^3$ behind its corresponding window. By pushing said rod S against lever $q$ this lever will be brought again into its former position engaging again with its projecting edge the catch $p^2$, but this will only be possible after the interruption of the current in the electro-magnet.

Figure 12:
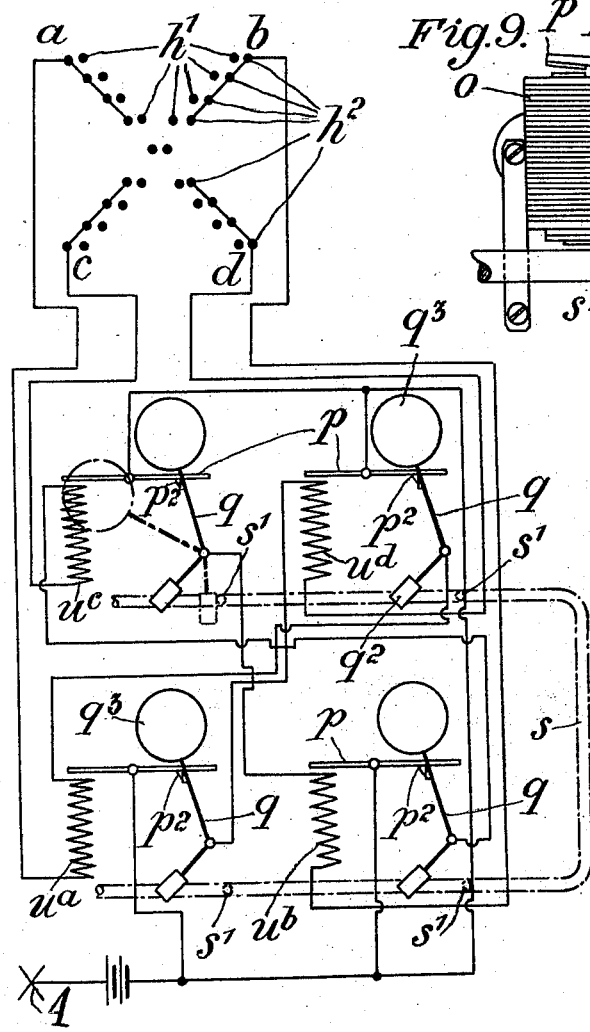
Figure 11:
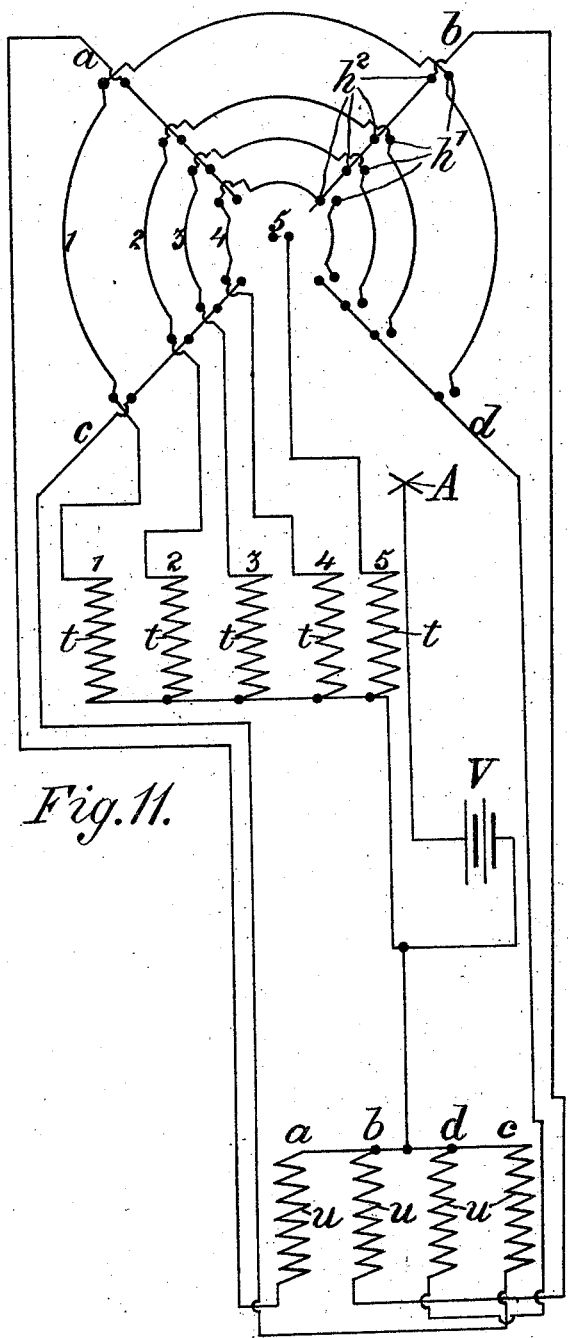
Fig. 11 is a diagrammatic view of the electrical connections in general and Fig. 12 a diagrammatic view of the electrical connections necessary for avoiding certain irregularities in working the indicating board.

In Figs. 11 and 12 of the accompanying drawing diagrammatic views are represented of the electrical connections for working a self-indicating target of five elements as shown in Fig. 5. Fig. 11 is a general view of the same and Fig. 12 a special arrangement for avoiding certain irregularities in the working of the indicating board and the contact apparatus.

As has been hereinbefore explained there are in a target of 5 elements in all 17 contact pins distributed, 4 on each ring and one on the center disk, and on two axes $a$—$d$ and $b$—$c$ set crosswise at 45°, each being fitted out for instance with a contact apparatus according to Fig. 3, where each apparatus is provided with two contact strips $h^1$ and $h^2$ insulated from each other and insulated from the body of the target. By making the electrical connections according to Fig. 11, the discs for all windows of the board may be operated for the hits on each element and each sector of the target by employing only 9 electromagnets according to Figs. 9 and 10, and 9 windows, whereas otherwise there would be necessitated 33 electro-magnets and 33 windows, owing to the fact that for all hits except for those on the center disc two windows and therefore also two electro-magnets ought to be employed.

A represents the body of the target and V a source of electricity. $u^a$, $u^b$, $u^c$ and $u^d$ represent the electro-magnets operating the window discs indicating the sectors, and $t^1$, $t^2$, $t^3$, $t^4$, and $t^5$, the electromagnets operating the window discs indicating the elements of the target. In each contact apparatus the strip $h^1$ is electrically connected with a conductor which, beginning with one strip, connects all four strips belonging to the same element of the target, and leads to one end of the electro-magnet $t^1$, $t^2$, $t^3$, $t^4$ or $t^5$, the other ends of which are connected to a conductor leading to the source of electricity. All the strips $h^2$ of each sector are electrically connected with a conductor leading to one end of the electro-magnets $u^a$, $u^b$, $u^c$ and $u^d$, the other ends of which are connected to a conductor leading to the same pole of the source of electricity as has been connected with the other electro-magnets. The other pole of said source of electricity being now connected with the iron body of the target which is in conducting connection with the pin $q^2$ of the pendulum of the contact apparatus, it will be obvious, that wherever the target may be hit it will be indicated by the electro-magnets operating the discs for the corresponding windows in such a way that, for instance, for a hit in the sector A and on the first element letter A and Figure 1 will appear in the corresponding windows or for instance if the sector between A and B has been hit, letters A and B will appear together with the Figure 1 at the corresponding windows.

It may now occur that, when a bullet has struck a certain part of the target, not only the contact apparatus of the very same part of the target is made to work but also owing to a certain kind of counter-action, also the contact apparatus of the opposite part of the target. This fact would cause not only the appearance at a window of the letter belonging to the sector which has been hit, but also the opposite sector. To avoid this the electrical connections of the electro-magnets operating the window discs of the sectors are made according to Fig. 12, where the electrical current for energizing each electro-magnet is passed through the angular lever $q$, catch $p^2$ and lever $p$ of the electromagnet of the opposite sector. The electric current operating the opposite electromagnet will therefore be broken at once, whenever an electro-magnet has been operated by a hit at the target and therefore only the one magnet corresponding to the sector hit will work, owing to the fact also that it takes more time for bringing into operation the counter-action of a hit to the opposite part of the target, than for breaking the circuit of the opposite electro-magnet.

I am aware that, prior to my invention, self-indicating targets have been made with electrical contact apparatus. I therefore do not claim such a combination broadly but what I do claim as my invention, and desire to secure by Letters Patent is:

1. In a device of the character described, a frame, a target, means for yieldingly mounting the target in the said frame, a rod passing through an aperture provided therefor in a wall of the said frame, means for yieldingly maintaining the said rod in contact with the said target, a cross arm fixed at the inner end of the said rod, an electric contact associated with the said cross arm, a lever pivotally mounted at one end of the said cross arm, and a weight secured to the opposite end of the said lever, the said lever and weight being swung into engagement in the said contact by a movement of the said rod to close an electric circuit.

2. In a device of the character described, a frame, a target, means for yieldingly mounting the target in the said frame, a rod passing through an aperture provided therefor in a wall of the said frame, means for yieldingly maintaining the said rod in position with one end thereof in contact with the said target, a cross arm secured to the opposite end of the said rod, a spring contact fixed in the said cross arm, a lever pivotally mounted at one end in the said cross arm, a weight attached to the opposite end of the said lever, and a pin secured in the said lever, the said lever and weight being actuated by the movement of the said target to swing the said pin into engagement with the said spring contact to close an electric circuit.

3. In a device of the character described, a frame, a plurality of target members, means for yieldingly mounting the said target members in position in said frame, a plurality of rods for each target member, each rod passing through an aperture provided therefor in the wall of a frame, means for yieldingly maintaining each of the said rods in position with the outer end thereof in contact with its target member, a central target member, a rod therefor, means for yieldingly maintaining the said central target member and rod in position in said frame, a cross arm secured at the inner end of each of the said rods, a weighted lever pivotally mounted at one end of each of the said cross arms, a contact secured in each cross arm, and a pin carried by each weighted lever, each weighted lever being actuated by a movement of its rod to swing the pin attached thereto into engagement with its contact to close an electric circuit thereat.

In testimony whereof I have affixed my signature in presence of two witnesses.

ARNOLD MICHOUD.

Witnesses:
   Dr. Rod. de Wurtemberg,
   Louis H. Munico.